Oct. 20, 1964 T. J. SWEENEY 3,153,468
PANEL ASSEMBLY HAVING A TRIM PIECE ATTACHED THERETO WITHOUT
PERFORATION OF THE PANEL
Filed March 12, 1962 2 Sheets-Sheet 1
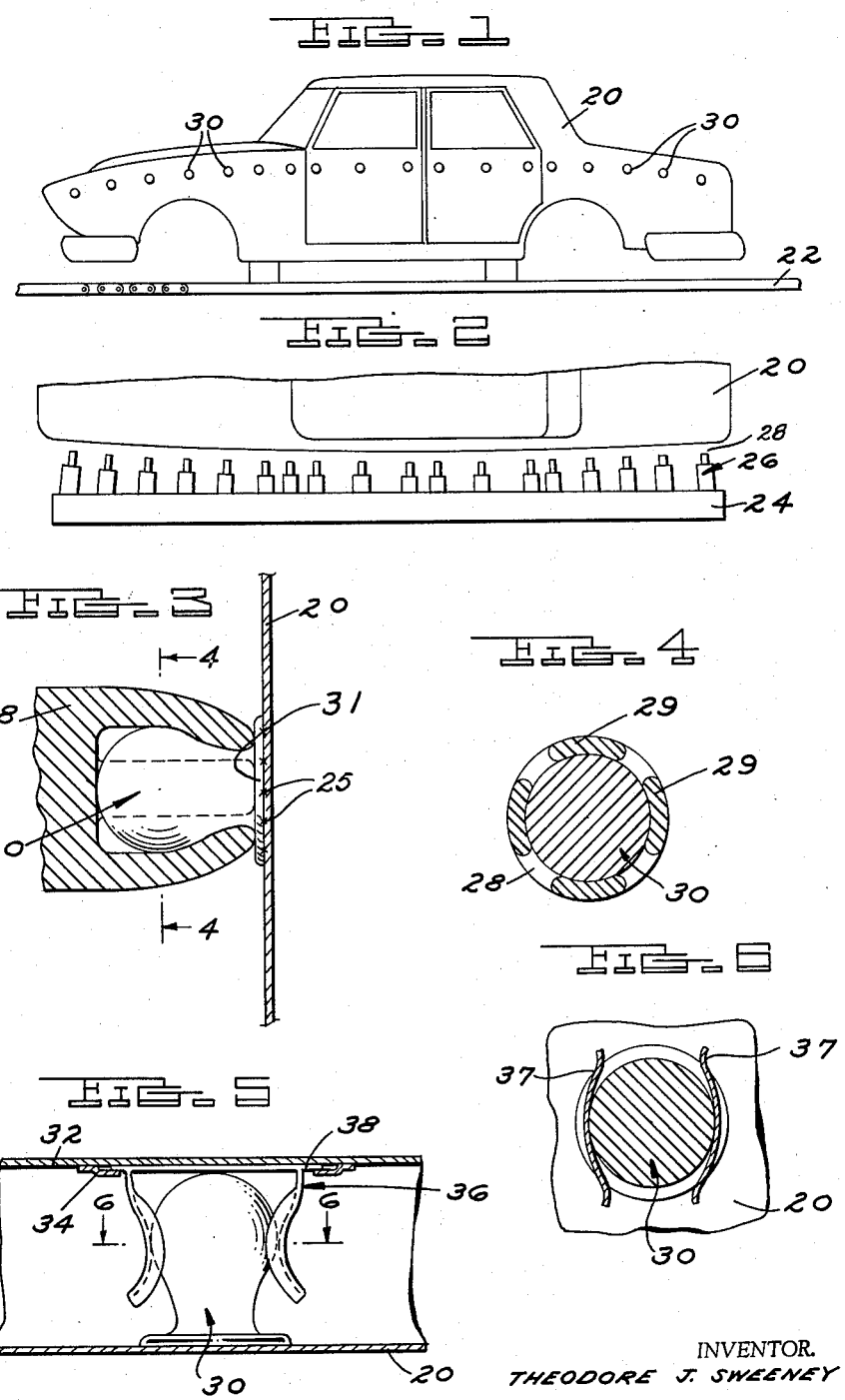
INVENTOR.
THEODORE J. SWEENEY
BY
Burton & Parker
ATTORNEYS

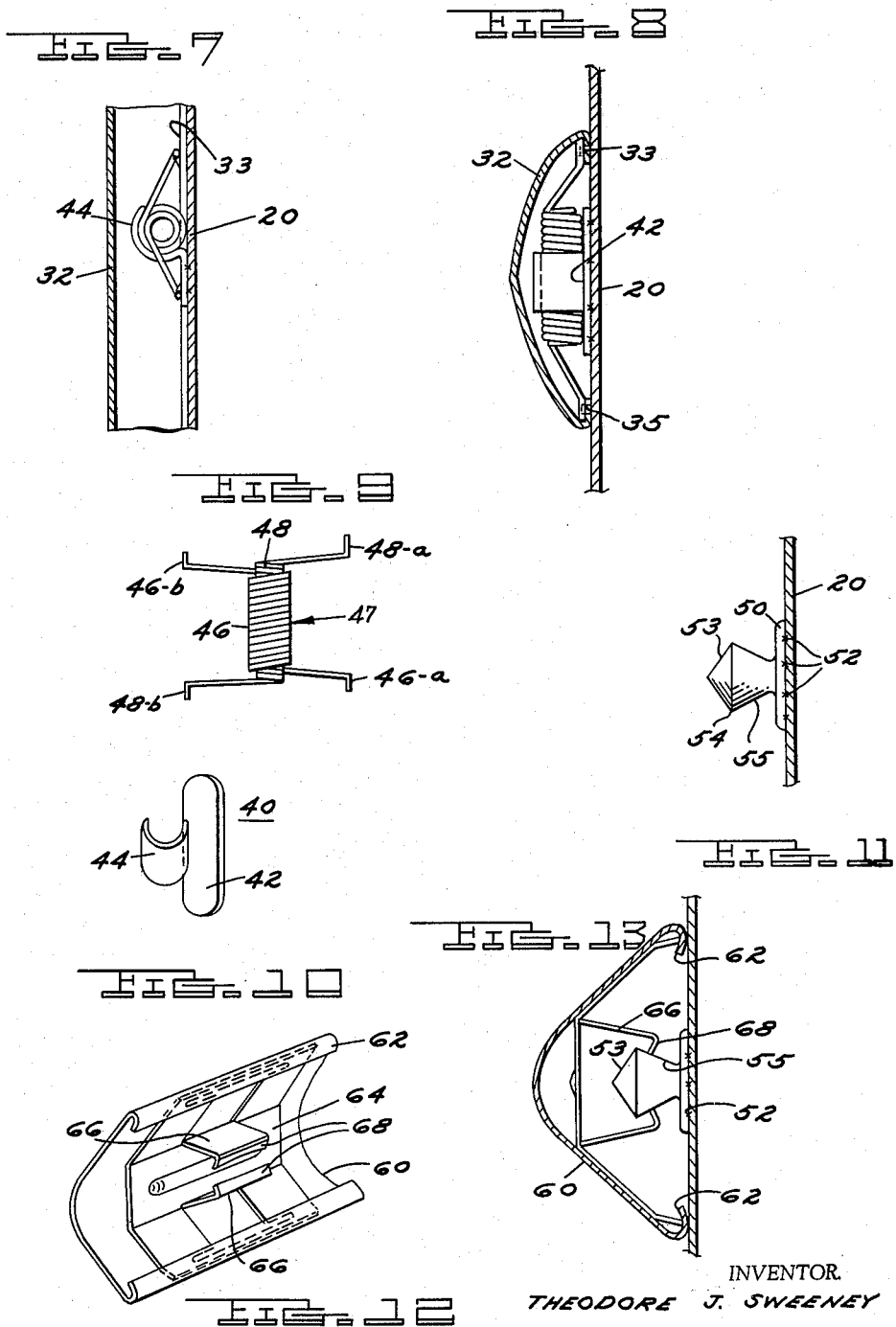

United States Patent Office
3,153,468
Patented Oct. 20, 1964

3,153,468
PANEL ASSEMBLY HAVING A TRIM PIECE ATTACHED THERETO WITHOUT PERFORATION OF THE PANEL
Theodore J. Sweeney, Grosse Pointe, Mich., assignor to Chicago United Products Company, Inc., Detroit, Mich., a corporation of Michigan
Filed Mar. 12, 1962, Ser. No. 179,128
6 Claims. (Cl. 189—88)

This invention relates to the finishing of the exterior surface of an automobile body and particularly to an automobile body the exterior surface of which is provided with decorative trim strips or pieces secured thereto.

Primarily it relates to finishing such a vehicle body including securing decorative trim pieces thereto and to accomplishing all of the finishing operations such as wet sanding, bonderizing, burnishing, painting, etc. without producing any points or sources likely to give rise to rusting, and without marring or damaging the finish coating with which the body is provided.

Heretofore, it has been common practice to provide automobile bodies with decorative trim strips or pieces of stainless steel or the like which strips or pieces were attached to the outer surface of the body wall by screws, bolts, or other attaching means. Such attaching means were commonly secured to the body wall by insertion through apertures or holes provided in the wall. Sealers to prevent leakage at such points were commonly associated with such fastening means. Such holes or apertures served as sources of rust origination, and once the rusting started it spread and gave rise to an unsightly appearing body wall and one which thereafter continued to deteriorate.

My invention is adapted to overcome this undesirable condition. It eliminates the holes through the body wall and also consequently eliminates the sealers. It is also designed to permit a complete finishing operation for an automobile body which operation may be rapidly and easily carried out and which results in a finish that is permanent and of attractive appearance and which substantially minimizes upkeep cost.

An object is the provision of an improved structure whereby an automobile body or sheet metal panel is provided with a suitable outer finish coating and a decorative trim strip is secured thereto without perforating the body wall panel, without marring the coating, and in fastening the strip or trim piece to the body in such a manner as to securely hold the trim strip in place thereon.

Another object is the provision of an improved structure of the character hereinabove set forth which structure enables the complete finishing of the metal wall of the automobile body prior to the securement of the decorative trim pieces thereto, and to thereafter securing the decorative trim pieces to such metal wall without perforating, marring or disfiguring the finished wall.

A meritorius feature is the provision of a structure as hereinabove outlined which includes the employment of cooperative means to secure decorative trim pieces to the exterior surface of automobile metal panels and particularly exterior body wall panels, and to accomplish such result without perforating the panels and without marring the finished surface of the panels.

More particularly, the structure hereinafter set forth comprises the employment of cooperative means to secure trim strips or pieces to the body wall, and wherein a fastener is securely fixed to the sheet metal wall panel of an automobile body prior to applying the finish coating to such panel, and the surface of the panel to which said fastener is attached is thereafter subjected to its complete finish coating treatment prior to the securement of the decorative trim strip thereto.

Preferably, cooperating male fasteners and female adapter means are employed and the male fastener is preferably secured to the exterior surface of the body wall and the cooperating female adapter means having opposed resilient fastener engaging elements is secured to the trim piece, when completely assembled the adapter means and trim piece providing a trim member secured to the fasteners. The male fastener is relatively small and of smooth even contour which blends with the surface of the panel to which it is secured so such panel may be properly and completely finished without the fastener unduly interfering with the carrying out of the finishing operations.

Another meritorius feature is that in the construction herein set forth the male fastener is fixedly secured to the body and the female adapter means is shiftably secured to the trim piece whereby slight discrepancies in accurate positioning will be accommodated for by shiftable positioning of the female adapter means, the trim member being resiliently distorted and inwardly reacting with the panel and outwardly reacting through the adapter means with the trim member securing surfaces of the fasteners to produce a tensioned connection between the trim member, fasteners and panel.

Further, decorative trim strips may be applied over portions of the body walls such as the roofs of closed bodies or the decks of trunk compartments, where trim strips are not currently being used, because of danger of leakage.

Other objects, advantages and meritorious features will more fully appear from the following specification, claims, and accompanying drawings, wherein:

FIG. 1 is a side elevation of a conventional automobile body mounted upon a conveyor to be carried along for finishing, the fasteners 30 being shown on an enlarged scale for clarity;

FIG. 2 is a schematic section of such body associated with electric welding means adapted to secure fastener to the body;

FIG. 3 is an enlarged sectional view through a fragment of the fastener retaining portion of an electric welder showing a fastener supported thereby;

FIG. 4 is a sectional view taken on the line 4—4 of FIG. 3;

FIG. 5 is a schematic sectional view through a trim strip showing an adapter means supported by the trim strip being inserted over the cooperating fastener secured to the vehicle body;

FIG. 6 is a sectional view taken on the line 6—6 of FIG. 5;

FIG. 7 is a sectional view through a fragment of a trim strip provided with a modified form of spring adapter means engaged with a cooperating fastener secured to the body wall;

FIG. 8 is a cross sectional view through the modified construction shown in FIG. 7 taken at a right angle thereto;

FIG. 9 is a plan of that portion of the trim member shown in FIGS. 7 and 8 which is carried by the trim strip;

FIG. 10 is a perspective of that portion of the trim member shown in FIGS. 7 and 8 which is carried by the body;

FIG. 11 is a side elevation of a modified male fastener secured to a fragment of a body panel which male fastener bears a general resemblance to the fastener shown in FIGS. 3 through 6, but represents an improved form thereof;

FIG. 12 illustrates a female adapter means carried by a trim strip which female adapter means is cooperable with the fastener of FIG. 11; and FIG. 13 is a cross sectional view showing interengagement of the elements of FIGS. 11 and 12.

This invention relates to the finishing of motor vehicle bodies where the bodies are provided as is common current practice, with decorative trim strips or pieces attached to the exterior thereof. Such decorative strips are generally attached by means of screws, bolts, or the like which extend through holes in the body wall. These holes form sources of rust production and such rust grows. Rust streaks form and extend away from the hole over the wall and impair the appearance of the body.

The instant invention has to do with the finishing of an automobile body which includes the securement of fasteners thereto during the finishing operation and without piercing or perforating the wall of the body and which fasteners are adapted to be cooperatively connected with other adapter means carried by a decorative trim strip whereby the trim strip may be attached to the body following the application of the finish coat to the body and without any modification or alteration of the body and without damage to the finish coat.

In the carrying out of this invention, different types of fasteners may be employed. Three different combinations are shown in the application as typical of those that might be used. It is a feature of this invention that the fastener is fixedly secured to the body at the beginning of the body finishing operation. The finishing operation is then carried out following the securement of this fastener to the body. The fastener which is secured to the body is preferably of a character which does not interfere with the carrying out of the finishing operations including application of the finish coat to the body. The cooperating adapter means is secured to the decorative trim part or the like that is to be attached to the exterior of the body. Following the completion of the application of the finish coat to the body, the trim part is then secured thereto through interengagement of the cooperating means.

In FIG. 1 the automobile body is indicated as 20; it is shown as supported upon a conventional conveyor mechanism 22. In FIG. 2 there is schematically illustrated a gang electric welding mechanism 24 provided with individual welding contact fixtures 26. Such are of conventional construction and specifically form no part of the invention. In FIG. 3 the fastener supporting socket or carrier is indicated at 28. A fastener 30 is illustrated as supported therein. The socket portion 28 is shown as embodying a plurality of fingers 29. These are more clearly illustrated in FIG. 4. These are resilient fingers adapted to support the fastener 30 as shown in FIGS. 3 and 4.

This fastener 30 is the male fastener of cooperating male and female means. This male fastener is shown as having a head portion at its outer end providing an inwardly facing trim member securing surface and a base portion 31 at its inner end. The base portion 31 is adapted to be welded throughout the extent of the inner end 31 to the body wall 20 as indicated at 25 in FIG. 3.

The female adapter means 36 is illustrated in FIGS. 5 and 6 and is shown in FIG. 5 as being carried by the trim strip or piece 32 which strip is somewhat channel shaped in cross section as shown in FIGS. 5 and 8. The female adapter means itself is indicated in FIG. 5 as being a two part structure. One part is a bracket portion 34 welded or otherwise secured to the interior of the trim strip 32. The trim piece 30 and the adapter means 36 comprise a trim member. The gripping portion of this female adapter means is indicated as 37 and has a base plate portion 38, which base plate portion is received and carried by the bracket portion 34 as shown in FIG. 5. This base plate portion is so held by the bracket part of the adapter means as to have relative shiftable adjustment thereunderneath linearly with respect to the trim strip as illustrated in FIGS. 5 and 6. Clearance is shown in FIG. 5 between the ends of the base plate 38 and the ends of the bracket 34. Such adjustment is in order that variations in positioning of the male fastener upon the body may be accommodated for by accommodation of adjustment of the gripping fingers 37 of the female adapter means 36.

As shown in FIGS. 5 and 6, the head portion of the male fastener 30 is cooperatively gripped by the fingers 37 of the gripping portion of the female adapter means 36 so that a trim strip provided with such female adapter means may be quickly attached to the male fastener that are secured to the body wall.

While the male fasteners 30 have been described as welded to the body wall, such may be secured thereto by suitable adhesives. Adhesive securement such as provided by Chrysler's "cycleweld," or well known epoxy resin adhesives such as are put out by "Minnesota Mining" or "Dow Chemical" might be used. What is necessary is that the securement be of such a character as not to damage or impair the body wall or produce points at which rust would originate to cause deterioration of the body wall. It is also necessary that the fastener which is secured to the body wall be of such character that the finishing of the body may be carried out thereover following the securement of the fastener thereto.

In the finishing operation as carried out on an automobile body several steps are involved. The surface of the metal is cleaned and while the metal is in the unfinished state, the fasteners 30 are secured thereto. They may be welded thereto as hereinabove stated. The complete finishing of the body is then accomplished. It is bonderized or otherwise suitably treated to inhibit rust. The different primer and paint coats are applied to it; alternating with the paint coats the body is burnished or polished with suitable burnishing brushes or wheels. The male fastener 30 is of such a character, being of smooth contour and lying close to the body and presenting no parts that would unduly interfere with either the cleaning, burnishing or painting operations, so that such are all carried out over the fastener and the resulting automobile body with the male fastener attached presenting no openings or poins which might be productive of corrosion. The paint coat seals the base of the fastener against the body wall and against the entry of moisture between the fastener and the body wall.

In FIGS. 7 through 10, a somewhat different type of interlocking fastener construction is illustrated. In these figures the body wall is also indicated as 20 and the trim strip as 32. The fastener which is shown as secured to the body wall is indicated as 40 in FIG. 10. It comprises a base portion 42 and a hook portion 44. This base portion 42 may be welded or otherwise securely fixed to the body 20 as shown in FIG. 8. The hook portion projects normally with respect to the base portion away from the body. The trim strip is provided with a cooperating fastener portion 47.

This cooperating fastener portion is shown in FIG. 9. It consists of two telescopically assembled spiral spring parts 46 and 48. The ends of the outer spring coils of the spring 46 are indicated as 46a and 46b. The ends of the spring coils of the inner spring 48 are indicated as 48a and 48b. These ends of the springs indicated as 46a, 46b and 48a and 48b constitute a base part. The trim strip itself is shown as having marginal flange portions 33 and 35 at the opposite walls of its channel shape. These flange portions are bent inwardly overhanging the inner surface of the trim strip as appears in FIG. 8. This spring adapter means is adjustable linearly of the trim strip by slidable adjustment of the spring ends underneath the flanges.

To assemble the spring structure shown in FIG. 9 upon the trim strip, the ends are tensioned and inserted underneath the flanges 33 and 35 as shown in FIG. 8 to form a trim member. The helical portion of the spring assembly 47 may then be received underneath the hook part 44 of the fastener that is secured to the body as shown in FIG. 8.

In FIG. 11, there is shown a male fastener generally similar to that shown in FIGS. 3 and 5, except that the head and shank portion thereof is somewhat differently shaped. In FIG. 11, the inner end or base of the fastener is indicated as 50. It is spot welded as at points 52 to the metal body. The head or outer end having an inwardly facing trim member securing surface of the fastener is indicated as 54. It is somewhat differently shaped from the head of the fastener 30 in that it is designed to be more easily received into the socket of a cooperating female adapter means. Moreover the shank and the under portion of the head is so sloped as shown in FIG. 11 as to cause the interlocking male and female elements to tension the decorative trim strip toward the automobile body. The head 54 of this male fastener is provided with a conical dome shaped crown 53 which is of a smooth contour and so shaped as to enter easily between opposed spring fingers of a female adapter means carried by the trim strip 60 as shown in FIGS. 12 and 13. The shank 55 of the male fastener and the underside of the head is conical in cross section and flares gradually and smoothly away from the base 50 of the fastener toward the head 54.

In FIGS. 12 and 13, the trim strip 60 is shown as having inturned side flanges 62 and the female socket like means 64 has a base the opposite ends of which are shown as received underneath and between the side flanges 62 of the trim strip as shown in FIGS. 12 and 13. The opposite ends of the base of this element are snugly received underneath these inturned marginal flanges of the strip and slidably thereunder linearly of the strip to adjusted positions. Such adjustment facilitates engagement between the male and female elements. The female element frictionally and resiliently maintains its adjusted position underneath the flanges of the strip and forms a trim member.

When the head 54 of the male fastener is received between the inturned ends 68 of the fingers 66 of the female element, the tension exerted by the female element upon the underside of the head and the shank of the male fastener tends to draw the trim strip toward the body as will be apparent from the view in FIG. 13. This is due to the flare of the shank 55 of the male fastener and the resilient engagement of the inturned fingers of the female element. The smooth contour of the head and shank of the male fastener is such that in any of the finishing operations performed on the body side wall such as buffing the same with burnishing wheels or the like, these finishing devices will pass freely over the male fastener without being caught thereby.

What I claim is:

1. A panel assembly comprising, in combination: a sheet metal panel, a plurality of relatively small male fasteners, said fasteners being secured at their inner ends to a surface of the panel without perforation of the panel with the fasteners arranged in a predetermined pattern, said inner end of each fastener abutting and secured to the panel throughout the extent of such inner end with all other surfaces of the fastener spaced from the panel, each fastener having a trim member securing head lying close to the panel and provided with a trim member securing surface inwardly facing toward the surface of the panel and spaced therefrom, each fastener being of smooth uniform shape having a low silhouette blending with the panel surface, a trim member coextensive with said predetermined fastener pattern in overlying and concealing relation thereon and juxtaposing the panel surface, said trim member including a trim piece and adapter means secured therein, said adapter means being at least in part resilient and having opposed fastener engaging elements resiliently engaging the trim member securing surfaces of the fasteners securing the adapter means thereon against outward movement and urging said trim member toward said panel and into stressed anchored relationship therewith.

2. A panel assembly as defined in claim 1 and wherein said fasteners are welded at their inner ends to the surface of the panel.

3. A panel assembly defined in claim 1 wherein the trim piece is provided with opposed inturned flanges and said inwardly facing surface of the trim member comprises the innermost surface of said flanges, and said adapter means comprises a plurality of individual adapter elements, one for each male fastener with the adapter elements grippingly engaging the trim piece outwardly of said flanges.

4. A panel assembly as defined in claim 2 and wherein a corrosion-inhibiting coating coats the panel surface contiguous to the fasteners and coats the fasteners and extends in a continuous unbroken coating over the entire periphery of the welded joint.

5. An automobile panel assembly comprising, in combination: a sheet metal panel, a plurality of relatively small male fasteners, said fasteners being welded at their inner ends to a surface of the panel without perforation of the panel with the fasteners arranged in a predetermined pattern, said inner end of each fastener abutting and welded to the panel throughout the extent of such inner end with all other surfaces of the fastener spaced from the panel, each fastener having a trim member securing head lying close to the panel and provided with a trim member securing surface inwardly facing toward the surface of the panel and spaced therefrom, each fastener being of smooth uniform shape having a low silhouette blending with the panel surface, a paint coat on said surface of the panel covering the same contiguous to the male fasteners and extending in a continuous unbroken film beneath said trim member securing surface and over the entire periphery of the joint between each fastener and the panel to inhibit corrosion, a trim member coextensive with said predetermined fastener pattern in overlying and concealing relation thereon and juxtaposing the painted panel surface, said trim member including a trim piece and adapter means secured therein connected to the fasteners, said adapter means being at least in part resilient and having opposed fastener engaging elements resiliently engaging the trim member securing surfaces of the fasteners securing the adapter means thereon against outward movement and urging said trim member toward said panel and into stressed anchored relationship therewith.

6. An automobile panel assembly as defined in claim 5 and wherein said trim member includes a trim piece having opposed inturned flanges and said adapter means is locked behind said flanges, said adapter means being resiliently distorted behind said flanges, and said outwardly facing surface of said adapter means includes opposed inturned flanges having edges which engage the trim member securing surfaces of the fasteners.

References Cited by the Examiner

UNITED STATES PATENTS

| | | | |
|---|---|---|---|
| 1,751,239 | 3/30 | Johnson | 24—216 |
| 2,020,062 | 11/35 | Jackson | 24—73 |
| 2,226,965 | 12/40 | Berger | 20—4 |
| 2,297,887 | 10/42 | Hall et al. | 189—88 |
| 2,644,213 | 7/53 | Bedford | 24—217 |
| 2,668,998 | 2/54 | Tinnerman | 24—217 |
| 2,922,542 | 1/60 | Barr | 189—36 |
| 2,963,133 | 12/60 | MacCallum | 189—88 |
| 3,031,049 | 4/62 | Somville | 24—73 X |
| 3,069,962 | 12/62 | Rapata | 24—216 |

JACOB L. NACKENOFF, *Primary Examiner.*